US010067477B2

(12) United States Patent
Poguntke et al.

(10) Patent No.: US 10,067,477 B2
(45) Date of Patent: Sep. 4, 2018

(54) WRISTWEARABLE DEVICE WITH TRAVEL INFORMATION INDICATORS

(71) Applicant: Timex Group USA, Inc., Middlebury, CT (US)

(72) Inventors: Felix Poguntke, Karlsruhe (DE); Achim Leicht, Neuhausen (DE); Alexander Pfitzenmeier, Wurmberg (DE); Stephanie Schneider, Pforzheim (DE)

(73) Assignee: Timex Group USA, Inc., Middlebury, CT (US)

( * ) Notice: Subject to any disclaimer, the term of this patent is extended or adjusted under 35 U.S.C. 154(b) by 0 days.

(21) Appl. No.: 15/201,992

(22) Filed: Jul. 5, 2016

(65) Prior Publication Data

US 2017/0115633 A1 Apr. 27, 2017

Related U.S. Application Data

(60) Provisional application No. 62/246,798, filed on Oct. 27, 2015.

(51) Int. Cl.
| | |
|---|---|
| *G04B 47/06* | (2006.01) |
| *G04C 17/00* | (2006.01) |
| *G01C 21/20* | (2006.01) |
| *G01C 19/00* | (2013.01) |
| *G01C 21/36* | (2006.01) |
| *G04G 9/00* | (2006.01) |
| *G04G 21/02* | (2010.01) |
| *G04C 3/14* | (2006.01) |

(52) U.S. Cl.
CPC .............. *G04B 47/06* (2013.01); *G01C 21/20* (2013.01); *G01C 21/362* (2013.01); *G04C 3/146* (2013.01);
(Continued)

(58) Field of Classification Search
CPC ...... G04B 47/06; G04C 3/14; G04C 17/0091; G04C 17/00; G04G 9/0064; G04G 21/04;
(Continued)

(56) References Cited

U.S. PATENT DOCUMENTS 5,721,713 A * 2/1998 Bornand ................. G01C 17/04
368/10
5,790,477 A * 8/1998 Hauke .................... G01C 21/20
368/10
(Continued)

OTHER PUBLICATIONS

International Search Report PCT/US16/58009, dated Jan. 24, 2017 (2 pages).

*Primary Examiner* — Vit W Miska
(74) *Attorney, Agent, or Firm* — Carmody Torrance Sandak & Hennessey LLP

(57) ABSTRACT

A wristwearable device for displaying travel information using at least one travel information indicator, the wristwearable device including a receiver for receiving data indicative of the travel information from a transmitting device; at least a first actuation mechanism, operatively coupled to the at least one travel information indicator, for rotating the at least one travel information indicator in at least one of a clockwise and counterclockwise direction; a controller, operably coupled to the receiver and the actuation mechanism, for causing the at least first actuation mechanism to rotate the at least one travel information indicator in at least one of the clockwise and counterclockwise direction based on the data received by the receiver; and wherein the position of the at least one travel information indicator conveys information regarding a travel.

8 Claims, 8 Drawing Sheets

(52) U.S. Cl.
CPC ....... *G04C 17/0091* (2013.01); *G04G 9/0064* (2013.01); *G04G 21/02* (2013.01)

(58) Field of Classification Search
CPC ........ G04G 21/02; G01C 19/00; G01C 21/20; G01C 21/36
See application file for complete search history.

(56) References Cited

U.S. PATENT DOCUMENTS

| | | | |
|---|---|---|---|
| 6,185,157 B1 * | 2/2001 | Farine | G01S 3/02 33/349 |
| 6,751,164 B1 * | 6/2004 | Sekiguchi | G04C 3/146 368/21 |
| 6,975,562 B2 | 12/2005 | Lizzi | |
| 7,027,362 B2 | 4/2006 | Lizzi et al. | |
| 7,072,246 B2 | 7/2006 | Lizzi | |
| 7,113,450 B2 | 9/2006 | Plancon et al. | |
| 7,113,451 B1 | 9/2006 | Matthey | |
| 7,266,051 B2 | 9/2007 | Plancon et al. | |
| 7,414,921 B2 * | 8/2008 | Gauthey | G01S 19/35 33/349 |
| 7,821,878 B2 | 10/2010 | Plancon et al. | |
| 9,001,625 B2 | 4/2015 | Essery et al. | |
| 2002/0141289 A1 | 10/2002 | Hayek et al. | |
| 2005/0128876 A1 | 6/2005 | Lizzi et al. | |
| 2012/0316777 A1 | 12/2012 | Kitta | |
| 2014/0011540 A1 | 1/2014 | Miyake | |
| 2015/0253742 A1 | 9/2015 | Baba | |

* cited by examiner

WRISTWEARABLE DEVICE WITH TRAVEL INFORMATION INDICATORS

CROSS-REFERENCE TO RELATED APPLICATION

This application claims the benefit of U.S. Provisional Patent Application Ser. No. 62/246,798 filed on Oct. 27, 2015, the subject matter of which is incorporated herein by reference in its entirety.

BACKGROUND OF THE INVENTION

The present invention is directed generally to wristwearable devices generally, and in particular, to a wristwearable device for displaying travel information using at least one travel information indicator, and wherein the wristwearable device includes a receiver for receiving data indicative of the travel information from a transmitting device. Methodologies to carry out the objectives and functionality set forth herein are also provided.

Smartphones are known to comprise various functions in addition to simply being used as a telephone. Functionality that comes with the phone, or which may thereafter be downloaded by way of application software (e.g. "apps"), includes global positioning system positioning to obtain positional information using global positioning satellites. For example, a user can easily obtain one's positional information, including route navigation information if desired, by using such software.

However, viewing the smartphone display for such positional, route navigational or other travel related information is not always desirable, convenient or even safe. For example, in the rain or snow it may not be desirable to expose the smartphone to the elements. While carrying packages or heavily dressed, it may not be convenient to take out one's smartphone and begin reviewing such positional, route navigational or other travel related information. And of course, while driving and/or riding a motorized/nonmotorized bike (motorcycle, bicycle or the like) it might not even be safe to start viewing the smartphone, which might result in a distraction.

The use of wireless communications, such as Bluetooth and other related and known wireless radio transmission technologies have made it possible to provide communication between a smartphone and other wireless devices, such as a wristworn device (e.g. a wristwatch). U.S. Pat. No. 9,001,625, owned by the present assignee is just such an example.

U.S. Publication No. 2012/0316777 also describes a navigation system that includes an electronic timepiece and a cellular phone. As described, the cellular phone is capable of executing GPS positioning and a navigation operation with regard to a travelling direction of a user. The timepiece and the cellular phone are described as including a short-range wireless communication function, such as by Bluetooth. The timepiece displays directional information digitally. A similar device is described in U.S. Publication No. 2014/0011540.

However, as best understood, both of these documents are limited in various respects. As a primary deficiency, the embodiments described in the aforementioned publication Nos. 2012/0316777 and 2014/0011540 are limited to wristworn timepieces of the digital type. In this regard, the state of the art is deficient in that there are no known embodiments in which a wristwearable device displays travel information using at least one travel information indicator that is under the control of an actuation mechanism, such as a stepper motor. Other deficiencies in the prior art will be discussed and understood from the disclosure herein.

It is thus believed that further advances to the state of the art are both desirable and achievable. In particular, it is desirable to provide a wristwearable device for displaying travel information using at least one travel information indicator, wherein the wristwearable device comprises a receiver for receiving data indicative of the travel information from a transmitting device, and wherein the travel information indicator is rotated by an actuation mechanism, which itself is preferably a stepper motor, thereby both furthering the state of the art and broadening the types of wristworn devices for which such display of travel information is available.

SUMMARY AND OBJECTIVES OF THE INVENTION

It is thus an objective of the present invention to overcome the perceived deficiencies in the prior art.

Specifically, it is an objective of the present invention to provide an improved wearable device of the analog type that can communicate with a transmitting device, such as but not necessarily a smartphone, so as to provide the wristwearable device with the ability to display travel information using at least one travel information indicator, wherein the travel information indicator is rotated by an actuation mechanism that is preferably a stepper motor.

It is also an objective of the present invention that the wristwearable device be able to display various types of travel information, for example and not limitation, next turn information, direction heading information, remaining distance to a selected destination, distance traveled from a selected destination, travel time since leaving a selected destination and/or remaining estimated time to a selected destination.

It is a further objective of the present invention to provide a transmitting device that can carry out and/or facilitate the foregoing objectives.

Yet a further objective of the present invention to provide an application that can be downloaded to the transmitting device for carrying out and/or facilitating the foregoing objectives.

Still a further objective of the present invention is to provide methodologies for carrying out and/or facilitating the foregoing.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

Therefore, to overcome the perceived deficiencies in the prior art and to achieve the objects and advantages set forth above and below, a preferred embodiment of the present invention is, generally speaking, directed to a wristwearable device for displaying travel information using at least one travel information indicator, the wristwearable device comprising a receiver for receiving data indicative of the travel information from a transmitting device; at least a first actuation mechanism, operatively coupled to the at least one travel information indicator, for rotating the at least one travel information indicator in at least one of a clockwise and counterclockwise direction; a controller, operably coupled to the receiver and the actuation mechanism, for causing the at least first actuation mechanism to rotate the at least one travel information indicator in at least one of the clockwise and counterclockwise direction based on the data received by the receiver; and wherein the position of the at least one travel information indicator conveys information regarding a travel.

In another preferred embodiment, the present invention is, generally speaking, directed to a wristwearable device for displaying travel information using at least one travel information indicator, the wristwearable device comprising a receiver for receiving data indicative of the travel information; at least a first actuation mechanism, operatively coupled to the at least one travel information indicator, for rotating the at least one travel information indicator in at least one of a clockwise and counterclockwise direction; a controller, operably coupled to the receiver and the actuation mechanism, for causing the at least first actuation mechanism to rotate the at least one travel information indicator in at least one of the clockwise and counterclockwise direction based on the data received by the receiver; and wherein the position of the at least one travel information indicator conveys information regarding a travel.

In a preferred embodiment, any of the wristwearable devices disclosed herein is a timepiece in the form of a wristwatch.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Generally speaking, the present invention is directed to a wristwearable device that can display travel information in an analog manner. For example, the present invention may use the information from a navigation (i.e. transmitting) unit and the corresponding application of e.g. the mobile or smartphone to show travel information such as directional information, including but not limited to "turn left," "turn right," "go ahead," "return," etc. by means of, for example, hands and/or hand combination on the wristwearable device. Preferably, the navigation information is transferred from the smartphone or mobile phone to the wristwearable device. Then the hands or other indicators on the wristwearable device move to show the user the achieved direction information. In such an example, there is no need to take the mobile phone out of its place (pocket or wherever it might be located). In other words, it may not be needed to be held in one's hand. Because the wristwearable device is preferably on the wrist and is usually always oriented but not limited to in one of two ways (e.g. on the left wrist with the 12 o'clock position pointing away from the user, while on the right wrist the same device might have the 12' o'clock position pointing towards the user), the display of travel information, as disclosed herein, is easily achievable.

In a preferred embodiment of the present invention, travel information may comprise the display of the direction that the user wants to move or drive. In such an embodiment, the travel information is transmitted from the transmitting device to the wristwearable device by a radio connection, e.g. Bluetooth (BT), Bluetooth Low Energy (BLE) or any similar radio signal. For example, by pressing a pusher on the wristwearable device or, alternatively by means of a position sensor in the wristwearable device, the radio transmission is started and the travel information can be transmitted to the wristwearable device. Then the travel information indicator on the watch moves to show the user the achieved directional information. Preferably, the travel information indicator is driven by independent motors, and preferably bi-directional stepper motors, but uni-directional motors can also be used therefor. As will be discussed herein, if there is more than one travel information indicator, a preferred embodiment provides that each travel information indicator has its own stepper motor associated therewith, although other configurations as would be understood in the art are achievable.

Figure 7:
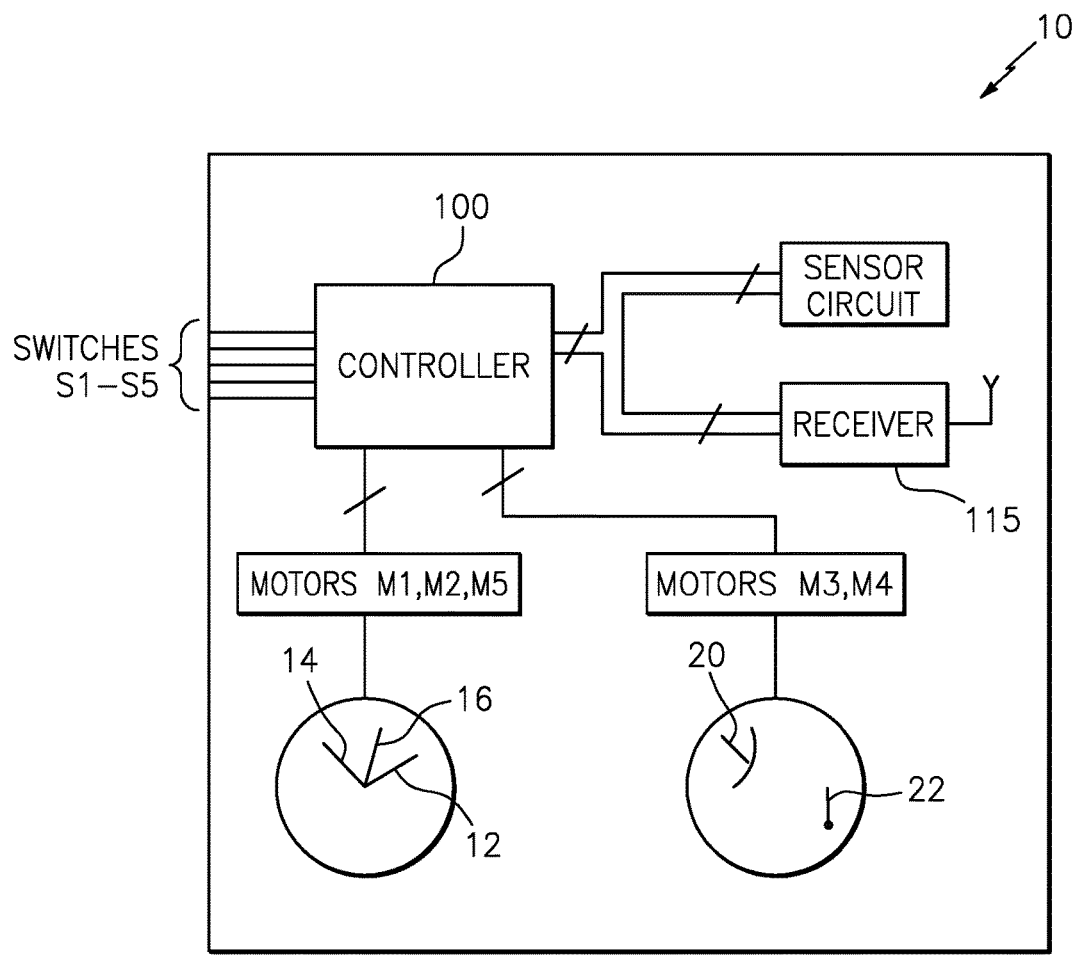

In one embodiment, the "12" o'clock position on the watch can be interpreted as the present direction the user is moving, meaning if the watch is held with the "12" o'clock position ahead, the travel information indicator(s) on the watch may point forwards/ahead or to the right or to the left for to indicate the next needed direction change for the user to be performed on the way to her desired destination. However, it should also be understood that the hands may be positioned elsewhere about the display and/or watch dial. For example, as discussed below, the travel information indicator(s) may be positioned at the 4 o'clock and/or 10 o'clock positions as desired. So, reference to a "12" o'clock position may merely be meant to be an "up" or "north" or otherwise, as the case may be. For example, indicator 22 shown in FIG. 7 is pointing to the "12 o'clock" position for purposes of explanation and understanding of the invention. Thus, the indicators disclosed and claimed herein can be positioned at various locations about the display and/or dial and the illustrations and positions provided herein are for exemplary purposes only.

Preferably the travel information indicator(s) can also function as the minute and/or hour hands when in a time-telling mode, but additional hands and/or other (e.g. dedicated) travel information indicators, as discussed herein, can be provided and used for the navigation information.

As will also be discussed further herein, in addition to the direction change (e.g. next turn information), the travel information indicator can be used to display other parameters and information, including but not limited to, direction heading information, remaining distance to a selected destination, distance traveled from a selected destination, travel time since leaving a selected destination and/or remaining estimated time to a selected destination.

Thus, it can be seen that in accordance with a first embodiment of the present invention, the wristwearable device may be a timepiece having the configuration and/or incorporating functionality as set forth in the figures herein and/or in the documents incorporated by reference herein. The wristwearable device may be a timepiece such as a wristwatch, and thus may comprise other features and parts, as would be understood by those skilled in the art and/or disclosed in the references cited herein.

For example, many details applicable to the present invention may be found in coowned U.S. Pat. No. 7,113,450 ("Wearable Electronic Device With Multiple Display Functionality"); U.S. Pat. No. 7,027,362 ("Multifunctional Rotating Ring in a Timepiece"); U.S. Pat. No. 7,120,091 ("Electronic Device with Calendar Function"); U.S. Pat. No. 7,821,878 ("Wearable Electronic Device with Multiple Display Functionality") and U.S. Pat. No. 7,072,246 ("Wearable Electronic Device With Multiple Ring Indicia Display"), the subject matter of all of which are fully incorporated by reference as if each one were fully set forth herein. The present disclosure omits, for purposes of brevity, certain basic and very well-known concepts regarding the construction of analog timepieces. For example, the basic construction and arrangements of gears and/or gear trains to rotate a plurality of "standard" hands all supported on a center stem, but not limited to, such as an hour hand, a minute hand and a "seconds" hand, are omitted as being well within the purview of one skilled in the art, as are details for ring rotations. Likewise, certain known constructions and arrangements of gears and/or gear trains to design a watch will likewise be omitted as being well within the purview of one skilled in the art, although again, such details can be found, for example, in the documents incorporated by reference herein.

Figure 1:
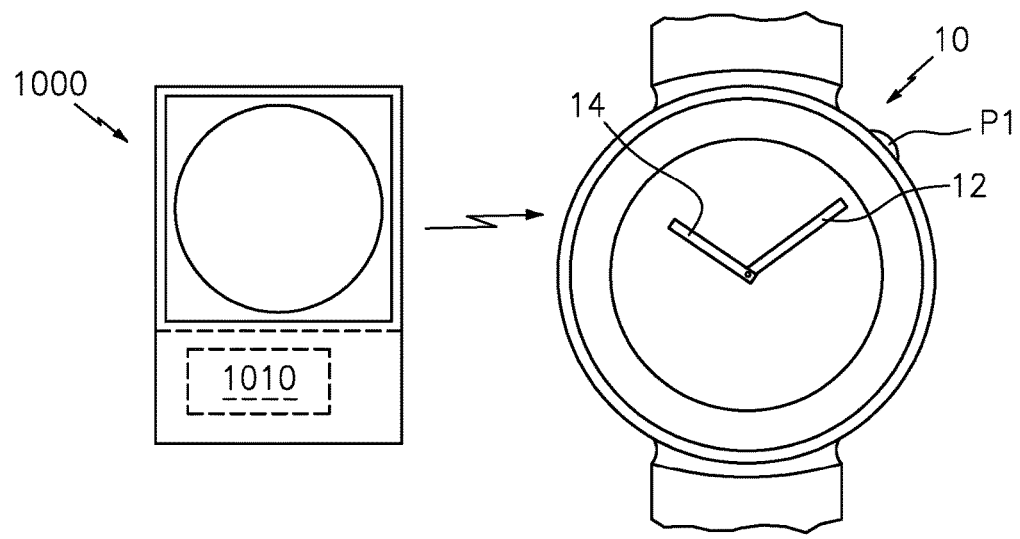
FIG. 1 is a general overall illustration of a wristwearable device, which is preferably a wristworn timepiece, generally indicated at 10, and constructed in accordance with the present invention, and a transmitting device, generally indicated at 1000, which is preferably, but not necessarily, a smartphone.

Turning now to additional specifies of the present invention, reference is first made to FIG. 1 which illustrates a general overall illustration of a wristwearable device, which is preferably a wristworn timepiece, generally indicated at 10 and constructed in accordance with a first embodiment of the present invention. Also shown is a transmitting device 1000, which is preferably, but not necessarily, a mobile phone or "smartphone" as would be commonly understood in the art. As noted above, transmitting device 1000 preferably communicates with wristwearable device 10 via Bluetooth or another wireless communication protocol known in the art. A wired tether however, is also contemplated herein for such communication therebetween.

Figure 2:
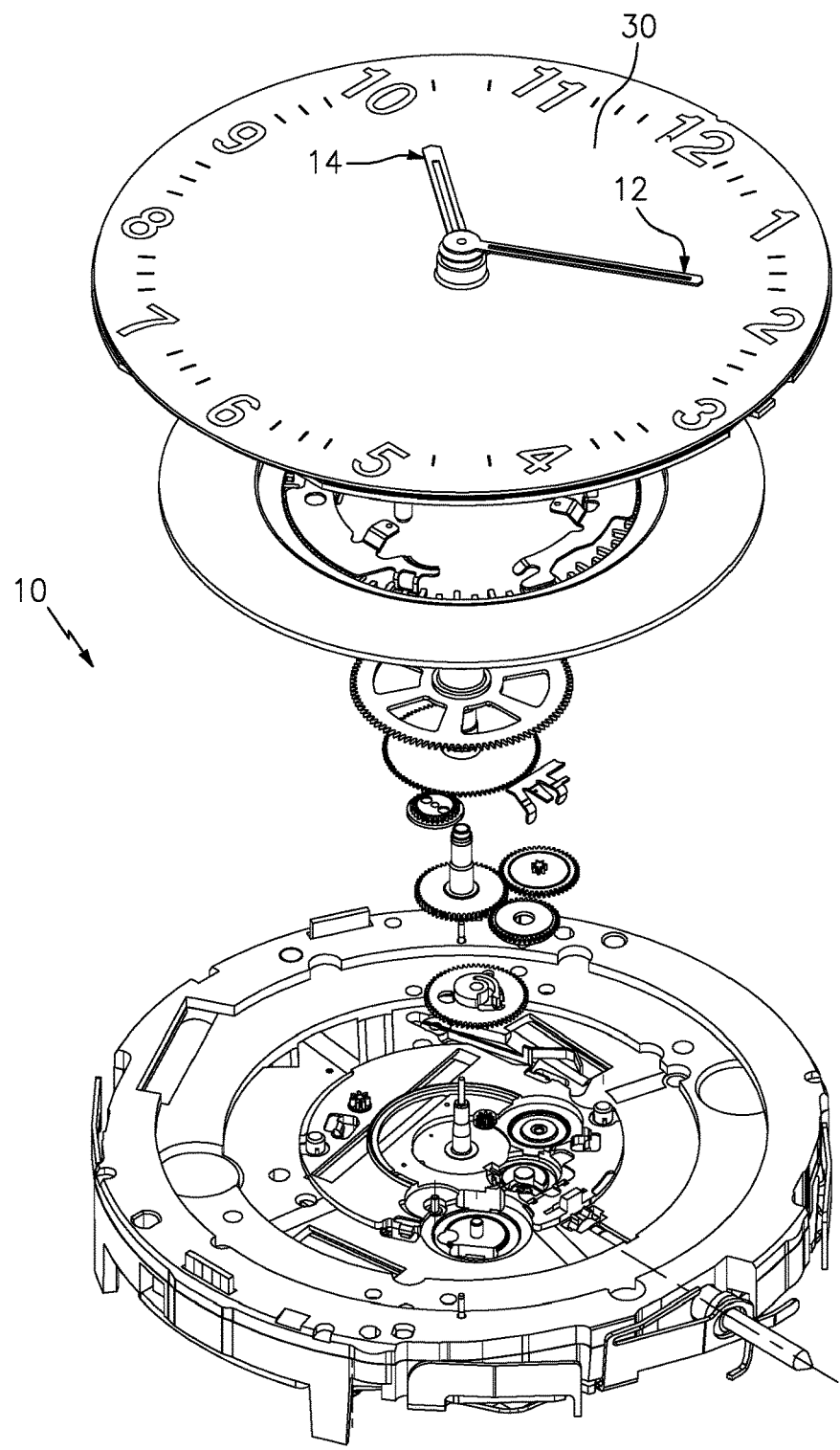
FIG. 2 illustrates the construction of an exemplary wristwearable device constructed in accordance with a preferred embodiment of the present invention.

FIG. 2 also illustrates the construction of the exemplary wristwearable device 10 constructed in accordance with this first preferred embodiment of the present invention. Wristwearable device 10 is of the type wherein information is conveyed in an analog manner at least in part by the use of at least one travel information indicator. By way of the phrase 'in an analog manner" for this specific patent application, it is intended to mean displaying such information using at least one travel information indicator, such as a display hand or display ring, which is operatively coupled to an actuation mechanism, such as a stepper motor. That is, a mere digital representation of a travel information indicator, such as a display hand or ring, is not deemed to be within the scope of the present invention.

Figure 3:
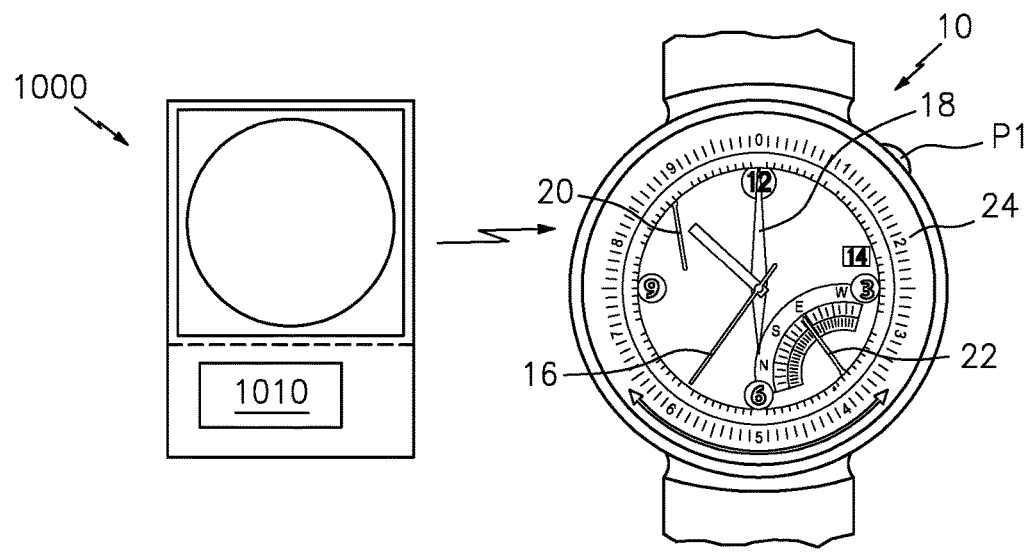
FIG. 3 illustrates yet another exemplary wristwearable device in accordance with an alternative embodiment of the present invention.

As will be understood in connection with this first preferred embodiment, the travel information indicator is a display hand, such minute hand 12 or hour hand 14. To be sure however, the use of display hands are by way of example and not limitation. For example, instead of a display hand it is possible to use a ring or other type of elongated member such as that disclosed in U.S. Pat. Nos. 7,027,362 and 7,072,246. For example, as illustrated in FIG. 3, a "seconds" hand 16, a "fourth" hand 18 and/or a rotatable ring 24 may be used in lieu of or in addition to the travel information indicators 12, 14 in the manner as disclosed herein. The use thereof will be described and/or be apparent from the disclosure herein. A linear indicator, such as that disclosed and claimed in U.S. Pat. No. 7,515,508 the subject matter of which is also incorporated by reference as if fully set forth herein, can also be used in connection with the present invention as well as dedicated indicators 20, 22 if desired.

For example, hand 22 may be used to display "North," "South," "East" and West indications, or alternatively, could be used to display minutes/hours to/from a selected destination, using the counter function of U.S. Pat. No. 6,975,562.

As illustrated in the figures, wristwearable device 10 is operationally coupleable to transmitting device 1000. By operationally coupleable, it is intended to mean that wristwearable device 10 and transmitting device 1000 communicate with each other via a wired or wireless link. In a preferred embodiment, the operational coupling is wirelessly through a Bluetooth low power radio system as disclosed above. The design and construction of such a low power radio system would be well known to those skilled in the art.

In a preferred embodiment, transmitting device 1000 comprises hardware and/or software that performs certain functions. For example, transmitting device 1000 is provided with such software and/or hardware (e.g. GPS technology) to obtain all such navigational, positional and other satellite available information as disclosed herein, needed to carry out the disclosed functionality and/or understood in the art. Further, transmitting device 1000 has software and/or hardware to provide for the receipt, calculation, computation, determination and transmission of at least one of (i) the next turn information, direction heading information, remaining distance to a selected destination, distance traveled from a selected destination, travel time since leaving a selected destination and/or remaining estimated time to a selected destination or (ii) data from which the next turn information, direction heading information, remaining distance to a selected destination, distance traveled from a selected destination, travel time since leaving a selected destination and/or remaining estimated time to a selected destination can be derived by the wristwearable device. Preferably, transmitting device 1000 is capable of transmitting all of such directional parameters and information and/or data for the derivation thereof. For the avoidance of doubt, transmitting device 1000 may be an iPhone or an Android phone by way of example and not limitation.

If the transmitting device 1000 transmits data to the wristwearable device 10 from which the travel information is derivable, it is within the contemplated configuration that the wristwearable device 10 accesses its respective own memory, look up table, etc. to derive the travel (e.g. "turn right") information. As such, wristwearable device 10 comprises memory or the like to carry out this functionality.

In addition, therefore, in a preferred embodiment, wristwearable device comprises at least a receiver (e.g.

receiver 115 in FIG. 7) for receiving, from the transmitting device 1000, the data indicative of the travel information. Wristwearable device 10 also comprises at least a first actuation mechanism, operatively coupled to the at least one travel information indicator, for rotating the at least one travel information indicator in at least one of a clockwise and counterclockwise direction; and a controller, operably coupled to the receiver and the actuation mechanism, for causing the at least first actuation mechanism to rotate the at least one travel information indicator in at least one of a clockwise and counterclockwise direction based on the data received by the receiver. In this way, the position of the at least one travel information indicator conveys information regarding a travel.

Reference is thus now also made to FIGS. 2-7 in connection with further details of the present invention. To be sure, many of the details are set forth in the aforementioned U.S. Pat. No. 7,113,450, incorporated by reference here, but out of an abundance of caution, the following is particularly set forth.

In accordance with a preferred embodiment, the wristwearable device further comprises a dial 30 having a dial side and an actuation mechanism side, wherein the at least one travel information indicator, such as hand 12 or hand 14, is positioned on the dial side of the dial 30.

Figure 4:
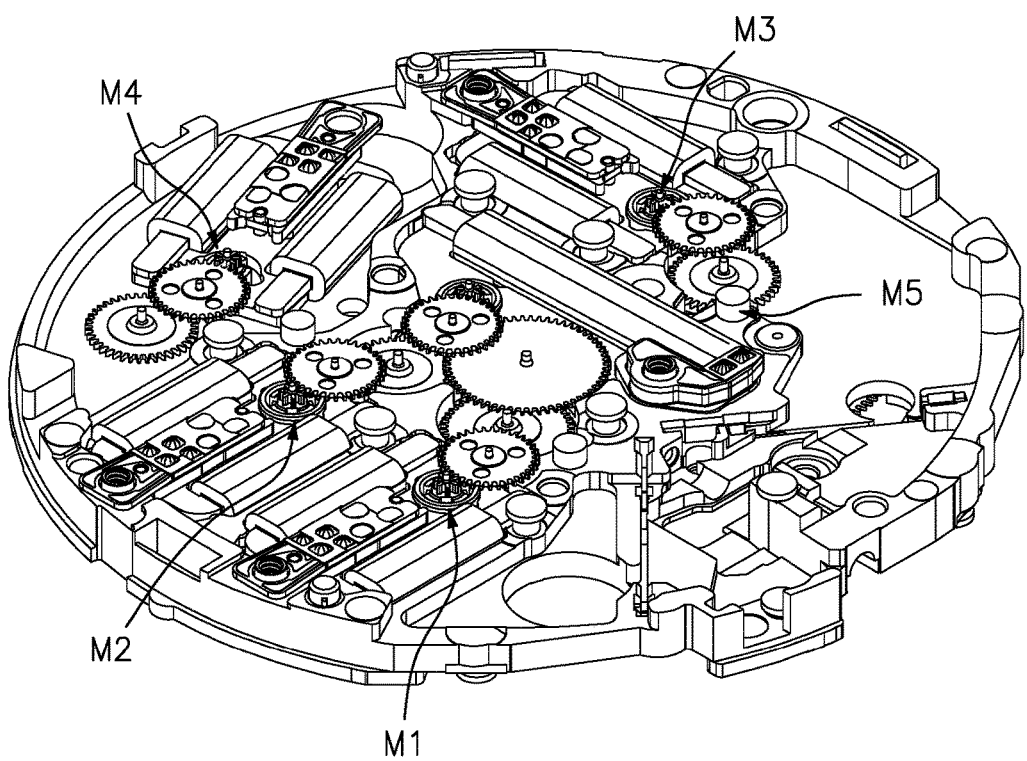
FIG. 4 is a perspective view of exemplary gearing and motors in a movement assembly for a wristwearable device constructed in accordance with a first preferred embodiment.

Preferably, wristwearable device 10, in order to carry out all the functionality set forth and/or contemplated herein, is provided with one or more subassemblies, each of which may comprise at least one actuation mechanism and one or more gears rotatably engaged with the actuation mechanism, wherein actuation of the actuation mechanism causes the rotation of the one or more gears. As illustrated in FIG. 4, the preferred actuation mechanisms are stepper motors designated generally as M1, M2, M3, M4 and M5 all of which are disposed in the module of wristwearable device 10. As would be understood in the art, their specific location is one of design choice and dictated by constraints such as spacing, power and torque requirements and the desired positioning of the display hands and/or rings, such as those disclosed in the patents incorporated herein by reference and illustrated herein. As positioned, the respective motors rotate respective pinions (or rings as the case may be), as would be understood in the art and/or after a review of the patents incorporated herein by reference. For the convenience of the reader however, it should be understood that as exemplary illustrated herein, motor M1 is provided to rotate indicator 12, indicator 14 is rotated by stepper motor M2, and respective gear trains are provided to convey the rotational activity generated by the rotor of motor M1, M2 to indicators 12, 14 as would be understood in the art. Likewise, indicator 22, and hands 20 and 16 are each respectively rotated by stepper motors M3, M4 and M5, and respective gear trains may also be provided to convey the rotational activity generated by the respective rotors of motors M3, M4 and M5. The construction of the respective gear trains are well within the purview of one ordinarily skilled in the art. In this way, rotation of indicators 12, 14, 16, 20, 22 could be independently controlled, the advantages thereof which will be disclosed below. A further motor could be provided for hand 18 if desired as would be understood in the art.

Figure 5:
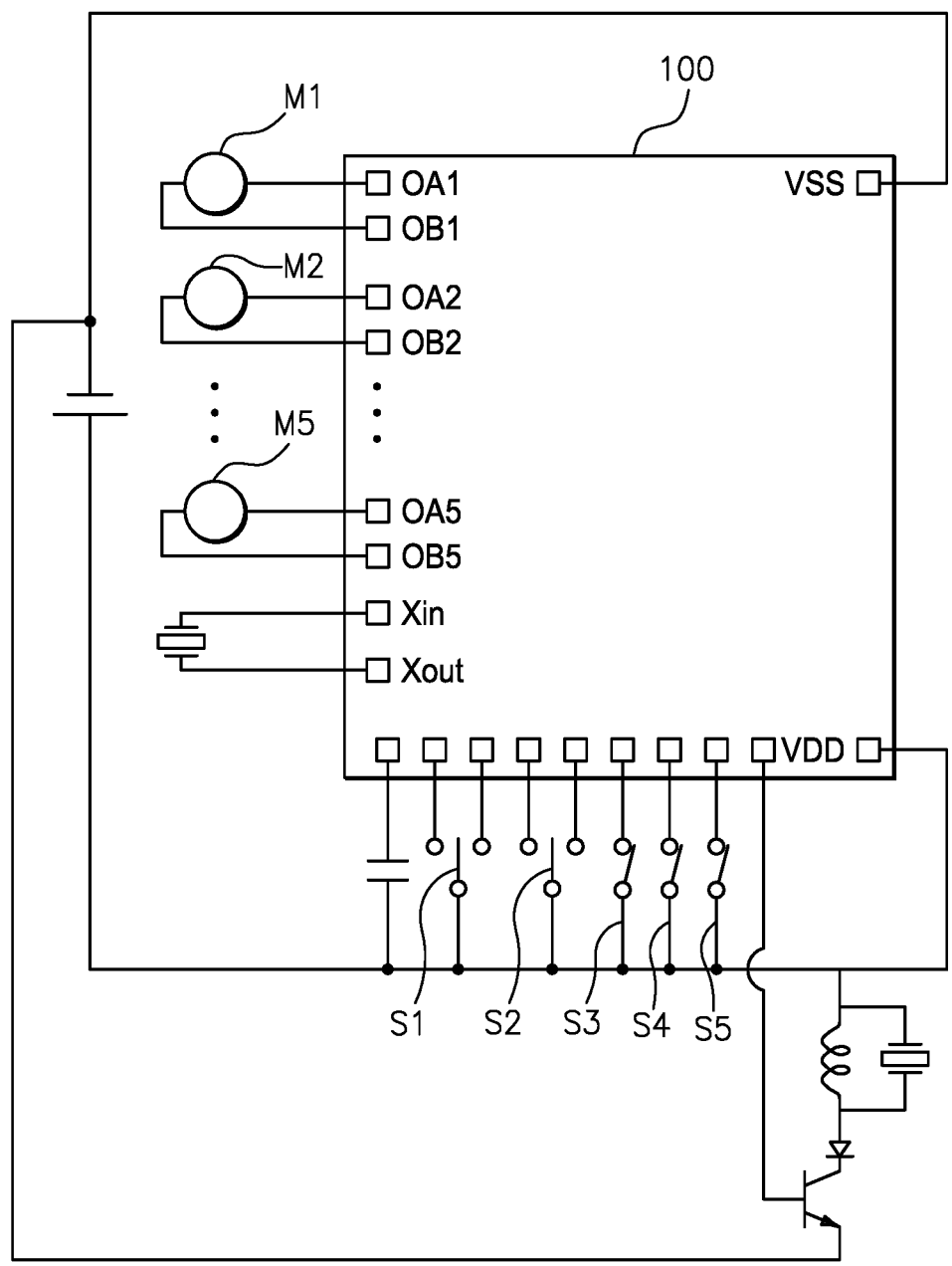
FIGS. 5-7 are block diagrams showing among other things, a controller for use in a wristwearable device constructed in accordance with the preferred embodiments of the present invention.
Figure 6:
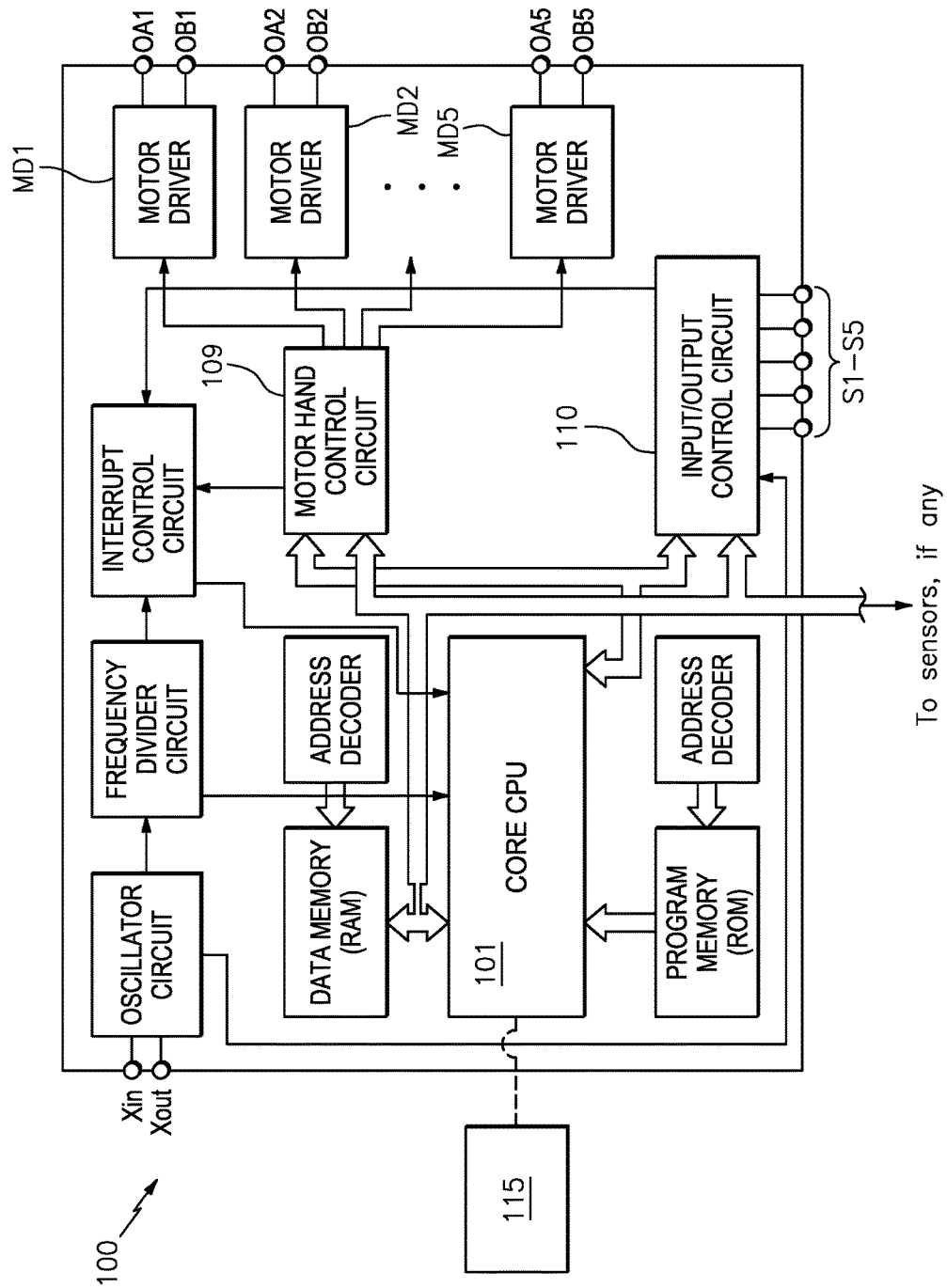

FIGS. 5-7 illustrate many features in accordance with the present invention, including a controller that provides the proper and accurate controlling, positioning and rotation of the one or more travel information indicators and/or any rings. Details of a controller, generally indicated at 100, can likewise be found in many of the aforementioned cited patents (with reference to controller 100 therein), and the controller of the present invention preferably comprises all of the functional features described therein to carry out the objectives and features of the present invention. The added functionality particular to the present invention shall now be disclosed, along with several details to ensure completeness of the disclosure.

For example, FIGS. 5-7 illustrate among other things, interface connections to motors M1, M2, M3, M4 and M5, and pushers, which are illustrated schematically as switches S1-S5. However, it is understood that the switches are also intended to generically indicate both side/top mounted pushers, as well as side mounted rotatable crowns, and thus respond to the actuation (i.e. pulling and/or pushing) action thereof.

FIGS. 6 and 7 illustrate block diagrams that include controller 100. Particular reference is made to motor control circuit 109, which receives a commanded "next number of pulses" from CPU core 101 and generates the pulsed and phased signals necessary to move a desired motor (e.g. M1-M5) a desired amount and in a desired direction. Pulse outputs of motor control circuit 109 are buffered by motor drivers MD1-MD5 and applied to the respective motors M1-M5. An input/output control circuit 110 can controls any crown/stem actuations and/or pushbutton switches S1-S5 and provides such signaling information to CPU 101. The use of the pushers and/or the crown can effectuate a change in operating modes, as would be understood by one skilled in the art.

Controller 100 causes the data transmitted by the transmitting device to be thereafter reflected by the position of the at least one travel information indicator. In view of using a stepper motor to control the rotation of the travel information indicator, such travel information is displayed in the claimed analog manner by the at least one travel information indicator (e.g. hand 12), by causing the rotation of the at least one travel information indicator in at least one of the clockwise and counterclockwise directions as necessary.

Controller 100, preferably knows the position of the rotors for the respective motors M1-M5, and thus causes the respective actuation mechanism(s) to rotate so that the selected travel information indicator and/or the ring, as the case may be, could move or otherwise rotate the appropriate amount. Moreover, the display hand and/or ring calibration methodologies disclosed in the aforementioned patents also assist in ensuring that the hands and/or ring are accurately positioned to display information that is reflected in the analog display of the wristwearable device 10. For such calibration purposes, the methodologies and constructions set forth in U.S. Pat. No. 7,266,051, entitled "Method and Construction for Autocalibrating an Actuation Mechanism," the subject matter of which is incorporated by reference in its entirety as if fully set forth herein, may be implemented.

That is, as would be understood in the art, the actuation mechanism, whether it is stepper motor M1, M2, M3, M4 and/or M5, itself comprises a rotor, and is operatively coupled to the controller 100, wherein the stepper motor steps in at least one of a clockwise and counterclockwise direction in predefined increments in response to commands from the controller 100, wherein the rotor of the stepper motor is operatively coupled to the at least one travel information indicator, and wherein the rotation of rotor causes the rotation of the at least one travel information indicator in at least one of the clockwise and counterclockwise directions and in the predefined increments.

For example, a simple actuation push of pusher P1 or an activation signal of a built-in sensor (e.g. position sensor) or the placing of device 10 is sufficient proximity of transmitting device 1000 would preferably cause the wristwearable device 10 to switch from a "time-telling mode" to a "travel mode," in which a variety of travel information parameters, such as next turn information, direction heading information, remaining distance to a selected destination, distance traveled from a selected destination, time, travel time since leaving a selected destination and/or remaining estimated time to a selected destination, can be conveyed to a user.

Figure 8A:
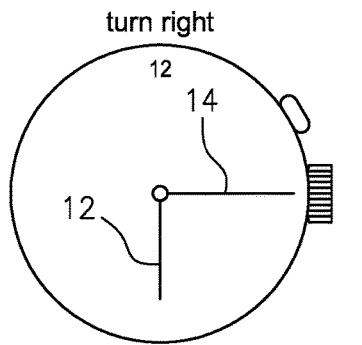
FIGS. 8A-8R illustrate exemplary displays for the wristwearable devices disclosed herein and in accordance with the present invention.
Figure 8B:
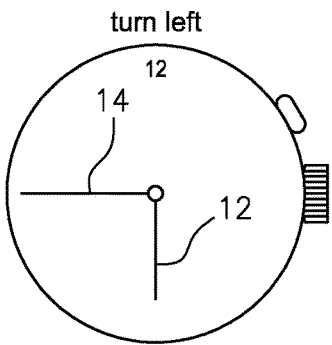
Figure 8C:
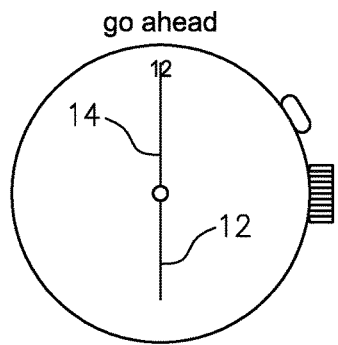
Figure 8D:
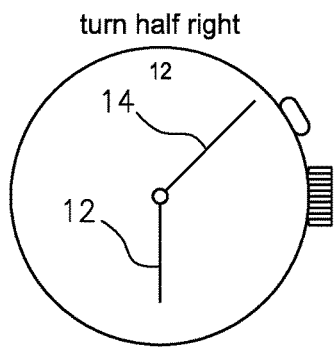
Figure 8E:
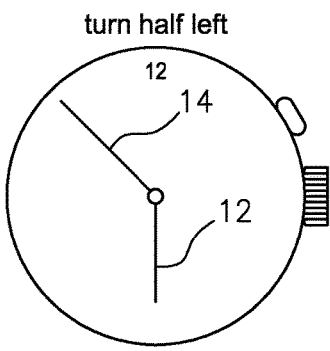
Figure 8F:
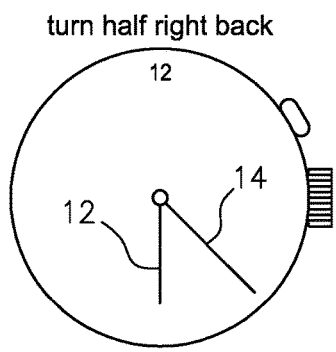
Figure 8G:
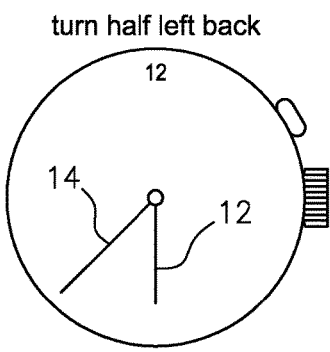
Figure 8H:
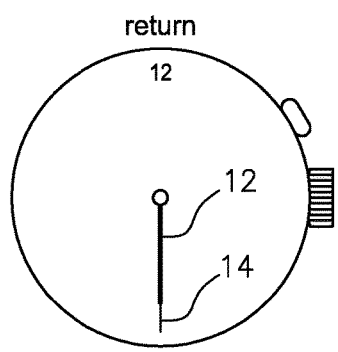
Figure 8I:
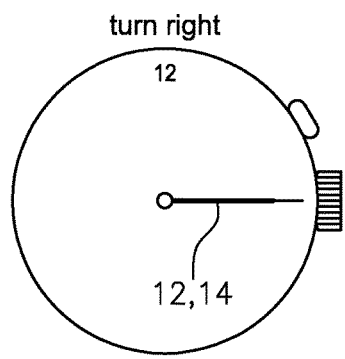
Figure 8J:
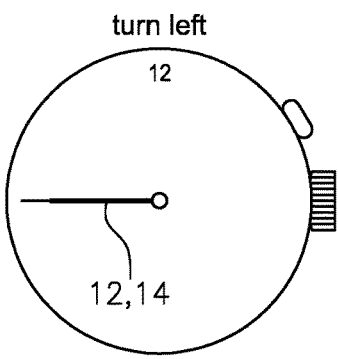
Figure 8K:
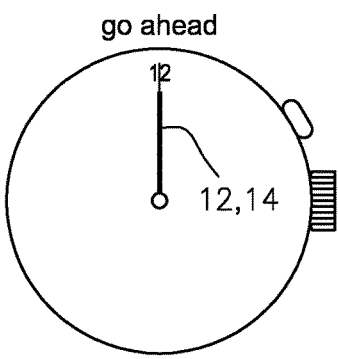
Figure 8L:
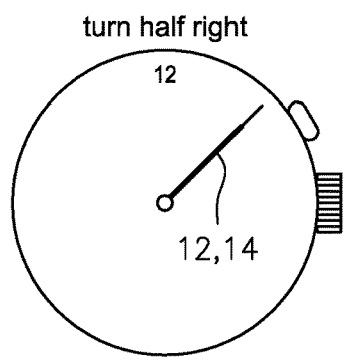
Figure 8M:
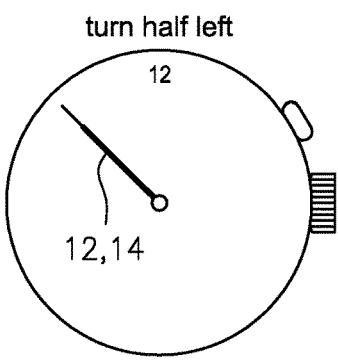
Figure 8N:
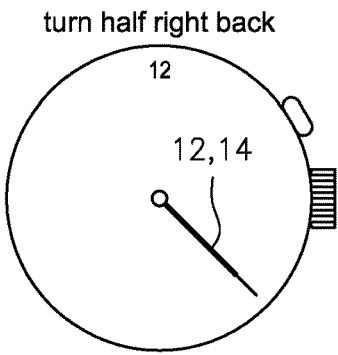
Figure 8O:
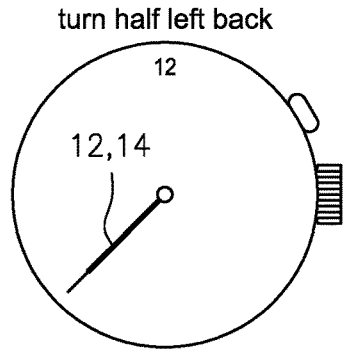
Figure 8P:
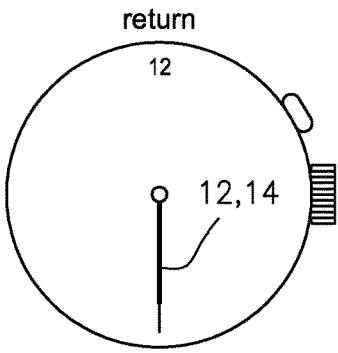

For example, and as illustrated in FIGS. 8A-8P once in a travel mode, the wristwearable device 10 could display to the user next turn information, such as "turn right" (FIG. 8A); "turn left" (FIG. 8B); "go ahead" (FIG. 8C); "turn half right" (FIG. 8D); "turn half left" (FIG. 8E); "turn half back right" (FIG. 8F); "turn half back left" (FIG. 8G); and "return" (FIG. 8H). In the foregoing examples, it can be seen that such travel information could be conveyed to the user with only one travel information indicator, e.g. hand 12. Alternatively, two display hands (e.g. minute and hour hands 12, 14) could be used to display similar travel information, such as "turn right" (FIG. 8I); "turn left" (FIG. 8J); "go ahead" (FIG. 8K); "turn half right" (FIG. 8L); "turn half left" (FIG. 8M); "turn half back right" (FIG. 8N); "turn half back left" (FIG. 8O); and "return" (FIG. 8P). In the examples of FIG. 8I through FIG. 8P, it can be seen that it would be preferable that indicators 12 and 14 be independently controlled by separate stepper motors so as to facilitate the rotation thereof independently of what would normally be required if the same hands were linked together in a traditional hour/minute configuration.

Figure 8Q:
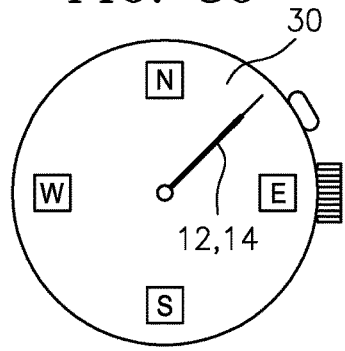

In addition, different scales could be placed on the dial 30, or dedicated hands could be used with printed displays on the dial, or even rotating rings with different scales could be provided (i.e. such as disclosed in U.S. Pat. No. 7,072,246) to provide that the travel information indicator(s) provide for yet additional information on the display of the wristwearable device. For example, direction heading information could be provided (e.g. FIG. 8Q) by use of the travel information indicator(s) 12 and/or 14. In such an example, North/East/South/West indicia could be provided on the dial or could be provided on a rotatable ring underneath the dial 30, with the corresponding indicator pointing to such directional indicia as appropriate. In the example of FIG. 8Q, the indicator(s) 12, 14 are indicating that the user is (or shall next want to be) heading "northeast." Again, the teachings in the aforementioned patents and/or U.S. Pat. No. 7,120,091 in particular, disclose the use of a rotatable ring in combination with a rotatable hand to convey information in an analog manner.

Moreover, a combination of (i) a travel information indicator 12 and/or 14 for pointing and (ii) a rotatable ring having (one or more scales thereon) i.e. using the functionality U.S. Pat. No. 7,072,246 could provide a rotating (or nonrotating) ring having a plurality of scales thereon, thereby providing enhanced features and facilitating the ability to convey, with one or more travel information indicator(s), remaining distance to a selected destination, distance traveled from a selected destination, travel time since leaving a selected destination and/or remaining estimated time to a selected destination. Providing for the appropriate scales and information indicia on the dial (or simply using the time-telling indicia), the travel information indicators could also convey the aforementioned information.

Figure 8R:
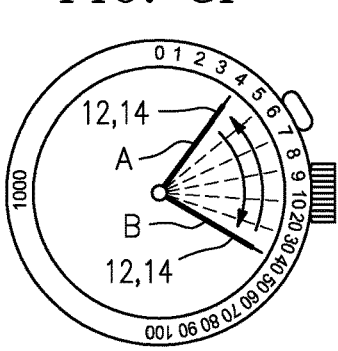

For example, FIG. 8R should be deemed to disclose a wide range of exemplary functions of the present invention. For example, in a first "distance mode" showing distance to a destination, indicators 12, 14 in the "A" position could depict that a user is 4 miles from a destination having previously been 40 miles from said destination (i.e. with the indictors having rotated from position "B" to position "A" over time as appropriate). Similarly, in a second "distance mode" showing distance from a destination, indicators 12, 14 in the "A" position could depict that a user was previously 4 miles from a destination and is now 40 miles from said destination (i.e. with the indicators having rotated from position "A" to position "B" over time as appropriate). Further, in a first "time traveled mode" showing an estimated arrival time to a destination, indicators 12, 14 in the "A" positon could depict that a user is currently 4 minutes from a destination having previously been 40 minutes from said destination (i.e. with the indicators having rotated from position "B" to position "A" over time as appropriate). Similarly, in a second "time traveled mode" showing time traveled from a destination, indicators 12, 14 in the "A" position could depict that a user had previously had only traveled 4 minutes from a destination and has now traveled 40 minutes since leaving said destination (i.e. with the indicators having rotated from position "A" to position "B" over time as appropriate).

Controller 100 maintains position information of the rotating ring (e.g. ring 24) and indicators (e.g. 12, 14) so they can work together to convey accurate information. Again, use of the indicators 12 and/or 14 on a traditional dial could also convey the same wide range of information using the hour/minute demarcations as the appropriate scale.

To be sure therefore, the present invention is also directed to an arrangement comprising both the wristwearable device of the type described above and a transmitting device as described above. Moreover, in a preferred embodiment, the data transmitted by the transmitting device is transmitted by the transmitting device over at least one of a wired link and a wireless link and preferably wherein the transmitting device is physically separated from the wristwearable device.

Applicable to all embodiments herein, it is preferable that transmitting device 1000 know of the model and/or type of wristwearable device 10. In this way, transmitting device 1000 includes hardware and/or software that permits the storing of information about the specific wristwearable device or type thereof. For example, such information could be stored in transmitting device 1000 at the time of manufacture, it could be downloaded by the user from, for example, the Internet (in the form of, for example, an "app") or in another preferred implementation, could be provided to the transmitting device 1000 directly (e.g. downloaded) from the wristwearable device itself. Transmitting device 1000 could also "read" a barcode, QR code or the like on or associated with the device 10 to thus acquire the specifics thereof. In this way, the communication between devices 10, 1000 can be synced up appropriately.

For purposes of adequate disclosure, transmitting device 1000 includes module 1010 which is deemed to represent the needed hardware and software applicable or attributable to the functionality of transmitting device 1000, including but not limited to permitting, causing and effectuating the transmission of data indicative of the travel information disclosed herein to the wristwearable device 10. Presumed to be overinclusive but for the avoidance of doubt, the disclosures of Publication Nos. 2012/0316777 and 2014/0011540 are incorporated herein by reference for such disclosure at the transmitting end, i.e. for the transmitting device 1000. Similarly, U.S. Pat. No. 7,113,450 provides disclosure on how the travel information indicators can rotate based on signals and information transmitted by a transmitting device.

In yet a variation of the foregoing, the dial itself may be an LCD or other type of display (e.g. e-Ink, OLED) in which the informational indicia corresponding to the mode in which the device 10 is operating may be provided thereon. In this implementation, the scales or other "surface" indicia need not be printed or otherwise provided on the dial, but rather the indicia on the LCD could change, thereby providing yet further enhancements in which a single LCD functions both as the dial for normal time-telling yet can change to accommodate all the differing modes in which device 10 can operate.

So, for example, controller 100 could cause the scale of such an LCD display of the wristwearable device 10 to change (e.g.: from 1-10 (e.g. hours) to 1-100 (minutes) or a combination of both (e.g. as in FIG. 8R) or from 1-10 miles to 10-100 miles as the case may be. That is, the data transmitted by the transmitting device 1000 to the wristwearable device 10 could be received by device 10 and cause controller 100 to configure the scale or other surface indicia on the LCD appropriately to more accurately and helpfully guide, or provide information to, the user. Even simple travel information (e.g. "turn right," "turn left" could be dependent on how the dial is configured using such an LCD display.

However, to be sure, what is constant in all of these examples is the use of the travel information indicators 12, 14 or the like are under the control of controller 100 and rotate by an actuation mechanism, preferably a stepper motor.

In the preferred constructions and methodologies, communication between transmitting device 100 and wristwearable device 10 may best be achieved through either Bluetooth or the new Bluetooth Low Energy, both of which are well known in the art, since this allows for device 10 to be compatible with the most number of types of transmitting devices. In the most anticipated constructions, transmitting device may be a "smart phone" as would be understood in the art.

Additionally, the foregoing implementations also may require customized code on transmitting device 1000 for communicating to device 10 (e.g. the watch). Such customizable code could be in the form of an application running on the transmitting device (e.g. an "app.").

To be sure, the one or more signals and/or any data sent from the transmitting device to the wristwearable device could be initiated by a pusher or a "send" signal or the like on the wristwearable device 10.

The foregoing sequence can be expanded to any number of travel information indicators or rings on wristwearable device 10, and the embodiments in those applications incorporated by reference herein show the wide ranging applicability of the present invention. Particular to the present invention, all that would have to be modified would be the indicators and the controller would have to be modified accordingly. Thus, the present invention provides alternative methods and constructions for simply, intuitively and more easily setting, changing, enabling, disabling and/or selecting features, modes or information as the case may be in a wristwearable device that displays travel information in an "analog" manner (i.e. uses rings and/or hands controller by stepper motors).

In the preferred embodiments, the motors may be bi-directional stepper motors as appropriate, thus being able to rotate in either direction, and the construction of acceptable stepper motors to functionally operate in this manner are widely available and well within the understanding of those skilled in the art. Suitable dials are also well within the purview of the skilled artisan. One skilled in the art would recognize that varying the number of travel information indicators can vary the number of needed stepper motors, all of which is within the scope of the present invention and disclosure and disclosed in those applications incorporated by reference herein.

Although the preferred embodiments provide that controller 100 is highly integrated wherein all timing and display functionality is controlled in controller 100, alternate embodiments could separate the timekeeping functions from those processing and other mode related information, as would be understood by one skilled in the art.

In an alternative embodiment, the functionality of the aforementioned transmitting device may itself be incorporated into the wristwearable device. For this purpose, FIG. 6 illustrates an alternative version in which receiver 115 is also provided as e.g. a fully functional receiver device or a distributed receiver arrangement (e.g. a receiver+GPS+any other structure/functionality needed to achieve the functionality of the transmitting device 1000) for the purposes of receiving travel information as disclosed herein. Thus, the use of a receiver 115 as illustrated in FIG. 6 is primarily indicated to be an alternative embodiment to that in which receiver 115 only receives travel information from transmitter 1000.

Therefore, in such an alternative embodiment, a wristwearable device for displaying travel information using at least one travel information indicator, comprises a receiver for receiving data indicative of the travel information; at least a first actuation mechanism, operatively coupled to the at least one travel information indicator, for rotating the at least one travel information indicator in at least one of a clockwise and counterclockwise direction; a controller, operably coupled to the receiver and the actuation mechanism, for causing the at least first actuation mechanism to rotate the at least one travel information indicator in at least one of the clockwise and counterclockwise direction based on the data received by the receiver; and wherein the position of the at least one travel information indicator conveys information regarding a travel. In all other aspects, all the wristwearable device embodiments are identical.

For completeness, it should thus be understood that in this alternative embodiment, the travel information may be transmitted directly to the wristwearable device from a satellite or cell-tower, by way of examples and not limitation. Thus, and similarly, by pressing a pusher on the wristwearable device or, alternatively by means of a position sensor in the wristwearable device, a radio transmission is started and the travel information can be transmitted to the wristwearable device. Therefore, the receiver 115, whether comprised of a single functional feature or distributed among multiple aspects of software and/or hardware, will perform certain functions. For example, the receiver 115 of this alternative embodiment will be provided with such software and/or hardware (e.g. GPS technology) to obtain all such navigational, positional and other satellite available information as disclosed herein, needed to carry out the disclosed functionality and/or understood in the art, including but not limited to, for the receipt, calculation, computation, determination and transmission of at least one of (i) the next turn information, direction heading information, remaining distance to a selected destination, distance traveled from a selected destination, travel time since leaving a selected destination and/or remaining estimated time to a selected destination or (ii) data from which the next turn information, direction heading information, remaining distance to a selected destination, distance traveled from a selected destination, travel time since leaving a selected destination and/or remaining estimated time to a selected destination can be derived by the wristwearable device. Any/all other features and functionality disclosed herein with respect to transmitting device 1000 is also attributable and incorporated into receiver 115 of this alternative embodiment. For example, if the data transmitted to the wristwearable device 10 from which the travel information is to be derived, it is within the contemplated configuration that the wristwearable device 10 accesses its respective own memory, look up table, etc. to derive the travel (e.g. "turn right") information. As such, wristwearable device 10 comprises memory or the like to carry out this functionality.

In all other respects, the wristwearable device of this alternative embodiment is identical to functions and features of the remaining and/or earlier disclosed embodiments.

As should also be appreciated by one skilled in the art, the location, position and/or size of the travel information indicators are merely dictated, for example, by the position of pinions and the position of the respective subassemblies and thus the illustrations herein are shown by example and not limitation.

The gearing ratio to provide for the desirable display rotation or movement of the travel information indicators or rings is one of design choice depending on the desired or required incremental rotation of the display indicators. Thus the number of wheels in any particular gearing assembly may be more or less than that disclosed herein, and are of design choice for the intended function and based upon a number of criterions known to the ordinary designer. Also, the functionality of the controller can be modified to accommodate the varying embodiments disclosed herein by software-programming techniques or differing controllers, both of which is well within the purview of the skilled artisan.

It can thus be seen that the present invention provides for an improved method and construction for setting, changing, enabling, disabling and/or selecting features, modes or information as the case may be in a wristwearable device, and the present invention provides an improved user interface therefor that is easy to use and which should be welcome to the user over those arrangements in the prior art. For example, as discussed above, using an LCD display the scales and/or other surface indicia indicating time/distance, direction can be changed according to the user's preferences or travel. Moreover, use of the disclosed controller with one or more travel information indicators as disclosed herein can provide for current direction, next traveled direction, upcoming direction and/or next steps in a travel path using both a conventional dial or the variations of dials, rings and/or LCD displays as disclosed herein.

In addition, the present invention can easily incorporate other advantageous features and functionality. For example and not limitation, sensors, such as an accelerometer, may be provided on/in the wristwearable device for counting steps. Such a sensor, when used in conjunction with an algorithm that takes into account the height and/or stride of the user, can permit the device to calculate distance traveled. Such traveled distance can then further be utilized by the wristwearable device to determine and/or alert the user to the next direction change. Other transmitting/receiving functionality in the wristwearable device would further allow the wristwearable device to communicate with the transmitting device, thus allowing the transmitting device to remain up to date on direction/distance and/or any other travel related information being maintained, calculated and/or displayed by the wristwearable device.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

To be sure, the present invention is applicable to a wide variety of devices and applications. That is, while the following embodiments have been disclosed with reference to particular modes, the scope of the invention is not so limiting.

What is claimed is:

1. A wristwearable device for displaying travel information using at least one travel information indicator, the wristwearable device comprising:
a receiver for receiving next turn information from a mobile device;
at least a first actuation mechanism, operatively coupled to the at least one travel information indicator, for rotating the at least one travel information indicator in at least one of a clockwise and counterclockwise direction;
a controller, operably coupled to the receiver and the actuation mechanism, for causing the at least first actuation mechanism to rotate the at least one travel information indicator in at least one of the clockwise and counterclockwise direction based on the next turn information received by the receiver; and
wherein the position of the at least one travel information indicator conveys information regarding a travel.

2. The wristwearable device as claimed in claim 1, wherein the controller causes the at least first actuation mechanism to rotate the at least one travel information indicator in at least one of a clockwise and counterclockwise direction in response to next data transmitted to the wristwearable device from the mobile device, and wherein the information conveyed by the at least one travel information indicator after said rotation conveys next information regarding the travel.

3. The wristwearable device as claimed in claim 1, wherein the travel information indicator is a display hand and the actuation mechanism is a stepper motor.

4. The wristwearable device as claimed in claim 1, wherein the travel information indicator is a ring and the actuation mechanism is a stepper motor.

5. The wristwearable device as claimed in claim 1, comprising:
a dial having a dial side and an actuation mechanism side, wherein the at least one travel information indicator is positioned on the dial side of the dial;
wherein the data transmitted by the mobile device is transmittable by the mobile device over at least one of a wired link and a wireless link and wherein the mobile device is physically separated from the wristwearable device.

6. The wristwearable device as claimed in claim 1, wherein the wristwearable device is a wristwatch.

7. The wristwearable device as claimed in claim 1, wherein the wristwearable device is operable in a plurality of modes, and wherein the display displays informational indicia corresponding to the mode in which the electronic device is operating, and wherein the informational indicia is changeable based on the mode in which the wristwearable device is operating; and wherein when the controller selects the mode in which the wearable device is to operate, the informational indicial on the display changes from displaying informational indicia associated with the first mode to the informational indicia associated with the second mode.

8. The wristwearable device as claimed in claim 1, wherein the mobile device is a mobile phone.

* * * * *